United States Patent
Daughtry et al.

(10) Patent No.: US 10,839,614 B1
(45) Date of Patent: Nov. 17, 2020

(54) SYSTEMS AND METHODS FOR RAPID CREATION OF THREE-DIMENSIONAL EXPERIENCES

(71) Applicant: Amazon Technologies, Inc., Seattle, WA (US)

(72) Inventors: Lane Daughtry, Seattle, WA (US); David Robert Cole, Brier, WA (US); Jason Andrew Brightman, Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/019,289

(22) Filed: Jun. 26, 2018

(51) Int. Cl.
*G06T 19/20* (2011.01)
*G06T 3/40* (2006.01)
*G06F 3/0481* (2013.01)
*G06T 15/20* (2011.01)

(52) U.S. Cl.
CPC .......... *G06T 19/20* (2013.01); *G06F 3/04815* (2013.01); *G06T 3/4038* (2013.01); *G06T 15/205* (2013.01); *G06T 2219/2004* (2013.01)

(58) Field of Classification Search
CPC ................... G06T 19/20; G06T 3/4038; G06T 2219/2004; G06F 3/04815
See application file for complete search history.

(56) References Cited

U.S. PATENT DOCUMENTS

| | | | |
|---|---|---|---|
| 8,674,998 B1* | 3/2014 | Schnitzer | G06T 15/20 345/475 |
| 10,311,636 B1* | 6/2019 | Falstrup | G06T 19/003 |
| 2007/0103461 A1* | 5/2007 | Suzuno | G06T 17/05 345/419 |
| 2008/0013860 A1* | 1/2008 | Blanco | G06F 9/451 382/285 |
| 2009/0135178 A1* | 5/2009 | Aihara | G06T 15/205 345/419 |

* cited by examiner

*Primary Examiner* — Edward Martello
(74) *Attorney, Agent, or Firm* — Athorus, PLLC (57) ABSTRACT

Systems and methods to rapidly create, view, and modify three-dimensional experiences may include a two-dimensional content editing device and application and a three-dimensional experience viewing device and application. Using the two-dimensional content editing application, two-dimensional objects may be created, and properties of the two-dimensional objects may be defined. Using the three-dimensional experience viewing application, the two-dimensional objects may be rendered within a three-dimensional environment based on the defined properties. In this manner, three-dimensional experiences may be quickly created, viewed, modified, reviewed, and published without the need for specialized tools, training, or experience in three-dimensional modeling or programming.

20 Claims, 6 Drawing Sheets

```
{       "skyboxName": outerspace,
        "crossFadeTime": 2.0
        "slides":  [
        {    "NEWSLIDE": "TRUE",
             "skyboxName": null,
             "images":    [
             {    "TYPE": "TITLE CARD"
                  "imageFileName":   "1.png"
                  "distance": 8.0,
                  "scale": 1.0,
                  "xOffset": 0.0,
                  "yOffset": -100.0
             }]
        },{  "NEWSLIDE": "TRUE",
             "skyboxName": null,
             "images":    [
             {    "imageFileName": "2.png",
                  "distance": 10.0,
                  "scale": 2.0,
                  "xOffset": 50.0,
                  "yOffset": 50.0
                  "ignoreFadeIn": "TRUE"
                  "ignoreFadeOut": "TRUE"
             }]
        },{  "NEWSLIDE": "TRUE",
             "skyboxName": spacestation,
             "crossFadeTime": 3.0
             "images":    [
             {    "imageFileName": "3.png",
                  "distance": 8.0,
                  "scale": 1.0,
                  "xOffset": 0.0,
                  "yOffset": -100.0
             },
             {    "imageFileName": "4.png",
                  "distance": 3.0,
                  "scale": 0.5,
                  "xOffset": 0.0,
                  "yOffset": -105.0
             },
             {    "imageFileName": "5.png",
                  "distance": 1.0,
                  "scale": 0.2,
                  "xOffset": 10.0,
                  "yOffset": -100.0
                  "tintHex": "999999ff"
                  "crossFadeTime": 4.0
             }]
        }
]}
```

- 402: lines 1–3 (skyboxName, crossFadeTime, slides)
- 404: first slide
- 406: second slide
- 408: third slide

SYSTEMS AND METHODS FOR RAPID CREATION OF THREE-DIMENSIONAL EXPERIENCES

BACKGROUND

Three-dimensional visual experiences, such as virtual reality games or experiences, are growing in popularity. Various types of environments and scenarios may be created or simulated in such three-dimensional experiences. However, creating immersive three-dimensional experiences can require specialized tools, training, and programming experience, in addition to being time-consuming and computationally intensive. Accordingly, there is a need for systems and methods to facilitate rapid creation of three-dimensional experiences without requiring such specialized tools, training, or experience in three-dimensional modeling and programming.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods to rapidly create and modify three-dimensional experiences are described herein. In addition, systems and methods to render and view three-dimensional experiences are described herein.

In example embodiments, various types of two-dimensional content may be placed within a three-dimensional experience using a two-dimensional content editing device and/or application. The two-dimensional content may include images, videos, user interface elements, widgets, text, or other content. In addition, a configuration file may be associated with the three-dimensional experience, and may include one or more properties associated with each item of two-dimensional content. For example, the one or more properties may relate to a size, scale, position, distance, horizontal offset, vertical offset, orientation, rotation, color, or fade time associated with a particular item of two-dimensional content.

In example embodiments, the two-dimensional content may be placed onto a plurality of slides, in which each slide may include one or more items of two-dimensional content. In addition, the plurality of slides may form a sequence of slides, and the sequence of slides may have a defined order.

In additional example embodiments, various types of environments, e.g., skybox environments, may also be placed within a three-dimensional experience. The environments may simulate a particular scene, location, or setting, and may comprise one or more images that may be stretched, stitched, formed, or otherwise rendered at boundaries of the three-dimensional experience. For example, the skybox environment may comprise an equirectangular image that may be stretched to encompass a sphere or dome associated with boundaries of the three-dimensional experience.

In further example embodiments, the environments, two-dimensional content, and/or configuration files may be stored in various types of storage. For example, the storage may comprise one or more memories associated with a two-dimensional content editing device and/or application, one or more memories associated with a three-dimensional experience viewing device and/or application, one or more memories associated with remote or cloud storage, or other memories or data stores.

In example embodiments, a three-dimensional experience including the environments, two-dimensional content, and/or configuration files may be retrieved from storage and processed and/or rendered in one or more instances or slides using a three-dimensional experience viewing device and/or application. For example, the three-dimensional experience viewing device and/or application may define aspects of the three-dimensional experience, such as available locations for rendering the two-dimensional content, viewing positions or orientations of a user of the three-dimensional experience viewing device and/or application, various dimensions associated with the three-dimensional environment, boundaries of the three-dimensional environment, and/or other aspects of the three-dimensional experience. In addition, the environments may be processed and rendered in one or more instances or slides as a background for the three-dimensional experience. Further, the two-dimensional content may be rendered in one or more instances or slides within the three-dimensional experience based on the one or more properties in the configuration files that are associated with each item of two-dimensional content. Moreover, transitions between slides and/or sequences of two-dimensional content may be effected based on the one or more properties in the configuration files that are associated with items of two-dimensional content, slides, and/or sequences.

In further example embodiments, the configuration files may comprise a markup language, such as a machine readable and/or human-legible markup language. For example, the configuration files may be created manually using rules or formats associated with a markup language. In other examples, the configuration files may be created at least partially automatically based on various received inputs. For example, a user interface may provide prompts and/or allow user input of one or more properties associated with an item of two-dimensional content, and the configuration files may be automatically created using the user input based on rules or formats associated with a markup language. In addition, a graphical user interface may allow drag and drop functionality or other visual interaction to place an item of two-dimensional content, and the configuration files may be automatically created using the user interactions with the graphical user interface based on rules or formats associated with a markup language.

Figure 4:
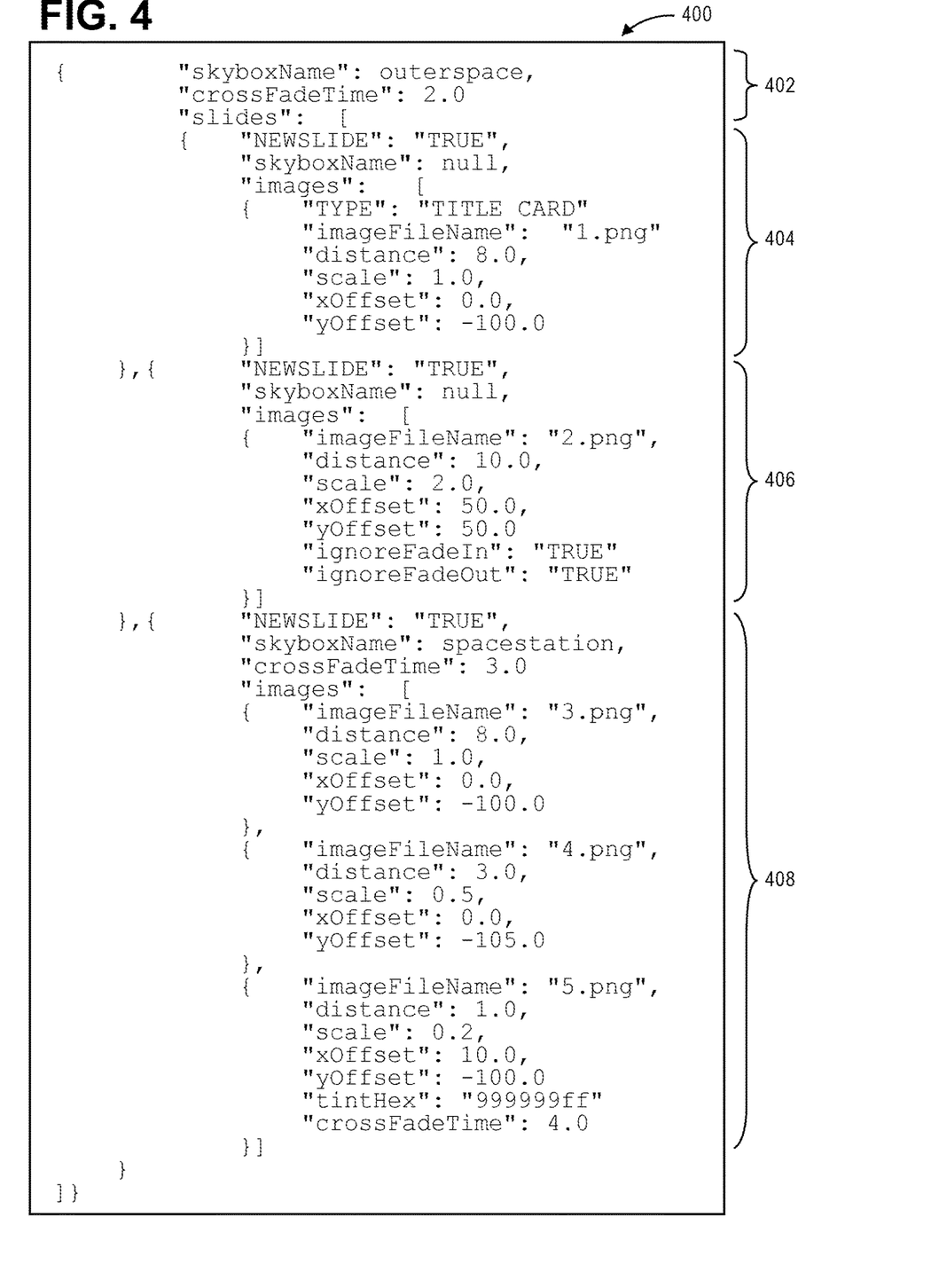
FIG. 4 is a portion of an example configuration file, according to an implementation.

In example markup languages, one or more tags or markup instructions may be associated with one or more text, characters, symbols, images, elements, or other objects, and the one or more tags or markup instructions may instruct formatting and/or presentation of the associated text, characters, symbols, images, elements, or other objects according to rules or semantics associated with a particular example markup language. In addition, the tags or markup instructions may comprise various formats or structures, and may also define various aspects related to the formatting and/or presentation of objects according to such tags or markup instructions, such as placement, location, size, scale, color, visual features, or other aspects. As further described herein, FIG. 4 shows a portion of an example configuration file in an example markup language.

In still further example embodiments, a three-dimensional viewing device and/or application may listen for or receive notifications of any changes to the environments, two-dimensional content, and/or configuration files in storage, and the three-dimensional viewing device and/or application may automatically process and/or render such changes. In this manner, rapid creation, modification, viewing, and/or iteration of three-dimensional experiences may be facilitated using two-dimensional content and configuration files that do not require specialized tools, training, or experience.

As one skilled in the art will appreciate in light of this disclosure, certain embodiments may be capable of achieving certain advantages, including some or all of the following: enabling creation of three-dimensional experiences without the need for specialized three-dimensional modeling or programming tools, training, or experience, improving or simplifying the creation and/or modification of three-dimensional experiences using two-dimensional content and associated properties, improving or automating the generation of configuration files having properties associated with two-dimensional content, providing simplified user interfaces for rapid creation or modification of two-dimensional content and associated properties for three-dimensional experiences, improving, simplifying, or automating the rendering and/or viewing of three-dimensional experiences based on two-dimensional content and associated properties, improving or reducing the computational load and processing time for rapid creation, processing, and/or review of three-dimensional experiences, facilitating collaborative creation and/or iteration of three-dimensional experiences among multiple users via shared remote storage of and access to content and associated properties, etc.

Figure 1:
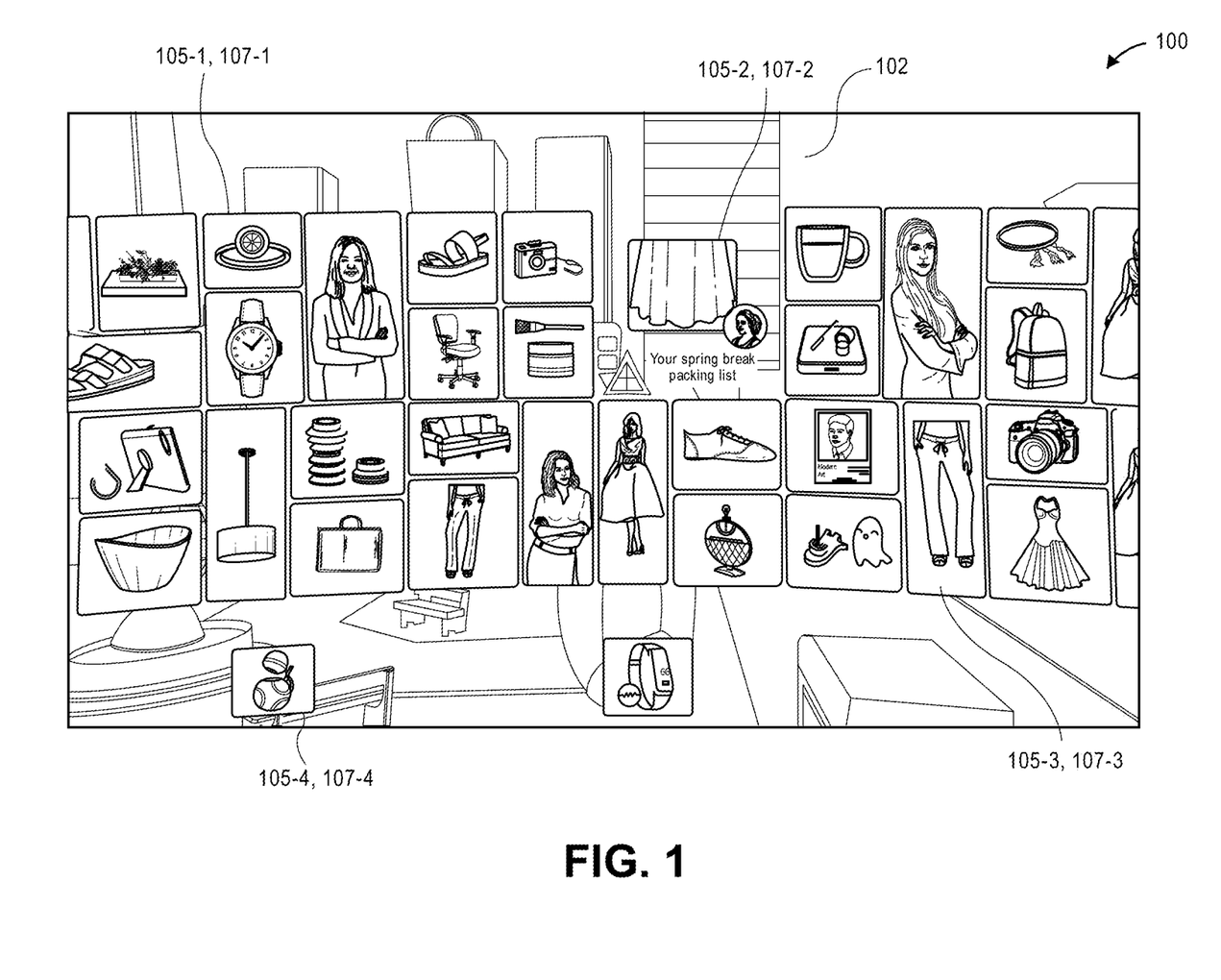
FIG. 1 is a schematic diagram of an example view of a three-dimensional experience, according to an implementation.

FIG. 1 is a schematic diagram of an example view 100 of a three-dimensional experience, according to an implementation.

The example view 100 may comprise a slide or instance including a skybox environment 102 and one or more items of two-dimensional content 105, in which each item of two-dimensional content 105 may be associated with one or more properties 107. The slide may comprise one of a plurality of slides or instances that together make up a sequence of slides or instances.

The environment 102 may comprise one or more images that may be positioned around a position of a user of the three-dimensional experience as a background image within the three-dimensional environment. For example, the background image may be formed or rendered on a sphere or a dome around the position of the user. The background image may comprise any type of environment, such as an indoor location, an outdoor location, an actual location, a hypothetical location, outer space, underwater, or any other scene, location, or setting. In some example embodiments, various processes or techniques, such as cube mapping, may be used to stitch or form the background image within the three-dimensional environment. In other example embodiments, the environment 102 may comprise an equirectangular image that may be stretched around a position of a user of the three-dimensional experience as a background image within the three-dimensional environment.

The two-dimensional content 105 may comprise one or more images, videos, user interface elements, widgets, text, or other types of content. For example, the images or videos may be associated with various products or services available for viewing and/or purchase within the three-dimensional experience, the user interface elements may comprise buttons or other interactive elements associated with various functions within the three-dimensional experience, and/or the widgets or text may be associated with various applications or information available within the three-dimensional experience.

In addition, each item of two-dimensional content 105 may be associated with one or more properties 107. For example, the one or more properties 107 may include a size, scale, position, distance, horizontal offset, vertical offset, orientation, rotation, color, fade time, or other properties of the two-dimensional content 105. Various of the properties may define a location or orientation of an item of two-dimensional content relative to a position of a user within the three-dimensional environment, and/or various of the properties may define visual aspects including size, scale, color, or fade time associated with an item of two-dimensional content.

As shown in FIG. 1, four items of two-dimensional content 105-1, 105-2, 105-3, 105-4 are labeled and shown with various associated properties 107-1, 107-2, 107-3, 107-4. Each item of two-dimensional content 105 may include various associated properties 107 that define a location, orientation, visual aspects, or other properties of each item of two-dimensional content 105. Although FIG. 1 shows a particular number and arrangement of a plurality of items of two-dimensional content 105 within an environment 102 based on respective associated properties 107, various other numbers or arrangements of two-dimensional content 105 may be created within an environment 102 with respective associated properties 107.

Figure 2:
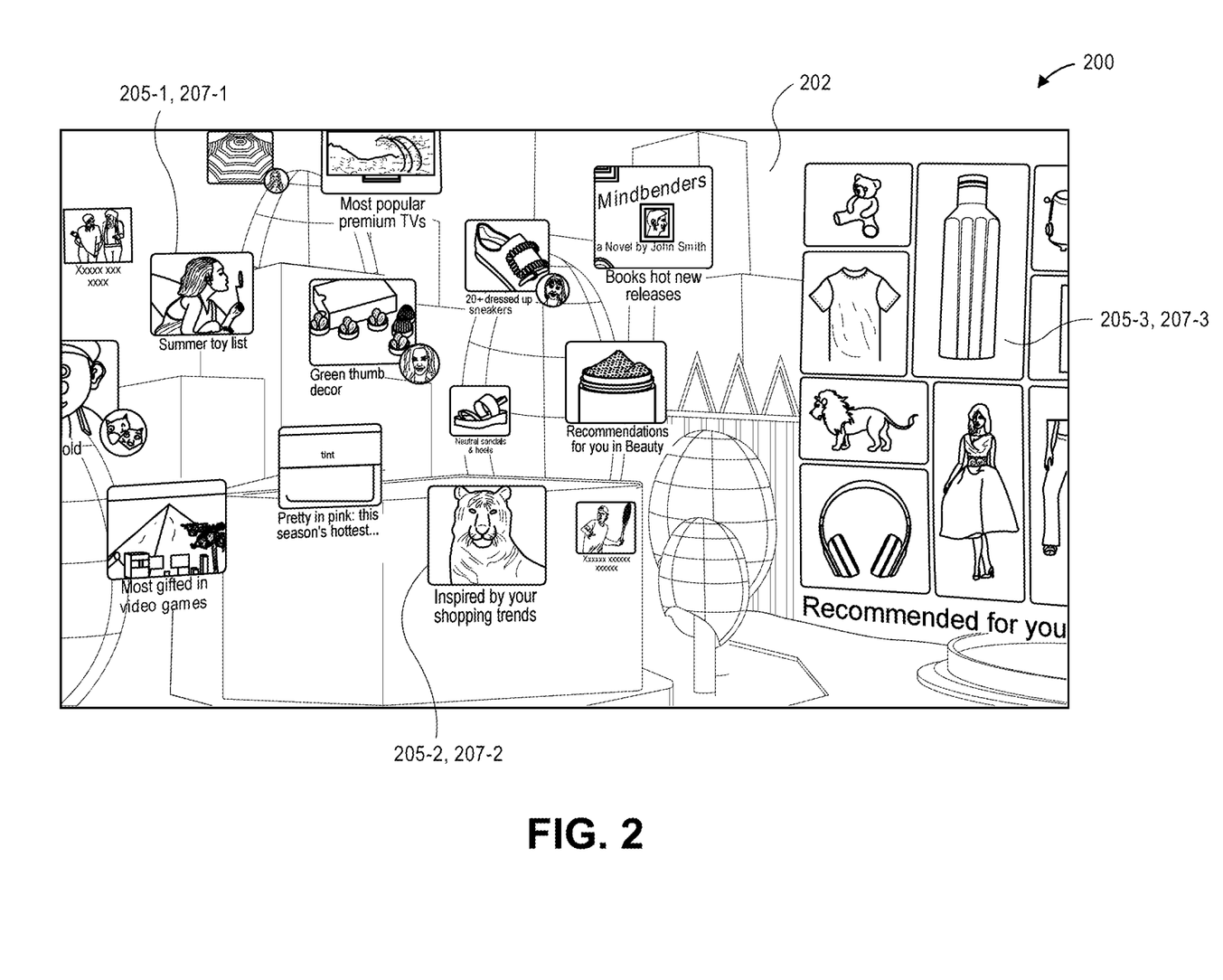
FIG. 2 is a schematic diagram of another example view of a three-dimensional experience, according to an implementation.

FIG. 2 is a schematic diagram of another example view 200 of a three-dimensional experience, according to an implementation.

The example view 200 may comprise a slide or instance including a skybox environment 202 and one or more items of two-dimensional content 205, in which each item of two-dimensional content 205 may be associated with one or more properties 207. The slide may comprise one of a plurality of slides or instances that together make up a sequence of slides or instances. In some example embodiments, the slides of FIGS. 1 and 2 may comprise two slides of a plurality of slides or instances that make up a sequence of slides or instances.

The environment 202 may comprise one or more images that may be positioned around a position of a user of the three-dimensional experience as a background image within the three-dimensional environment. For example, the background image may be formed or rendered on a sphere or a dome around the position of the user. The background image may comprise any type of environment, such as an indoor location, an outdoor location, an actual location, a hypothetical location, outer space, underwater, or any other scene, location, or setting. In some example embodiments, various processes or techniques, such as cube mapping, may be used to stitch or form the background image within the three-dimensional environment. In other example embodiments, the environment 202 may comprise an equirectangular image that may be stretched around a position of a user of the three-dimensional experience as a background image within the three-dimensional environment.

The two-dimensional content 205 may comprise one or more images, videos, user interface elements, widgets, text, or other types of content. For example, the images or videos may be associated with various products or services available for viewing and/or purchase within the three-dimensional experience, the user interface elements may comprise buttons or other interactive elements associated with various functions within the three-dimensional experience, and/or the widgets or text may be associated with various applications or information available within the three-dimensional experience.

In addition, each item of two-dimensional content 205 may be associated with one or more properties 207. For example, the one or more properties 207 may include a size, scale, position, distance, horizontal offset, vertical offset, orientation, rotation, color, fade time, or other properties of the two-dimensional content 205. Various of the properties may define a location or orientation of an item of two-dimensional content relative to a position of a user within the three-dimensional environment, and/or various of the properties may define visual aspects including size, scale, color, or fade time associated with an item of two-dimensional content.

As shown in FIG. 2, three items of two-dimensional content 205-1, 205-2, 205-3 are labeled shown with various associated properties 207-1, 207-2, 207-3. Each item of two-dimensional content 205 may include various associated properties 207 that define a location, orientation, visual aspects, or other properties of each item of two-dimensional content 205. Although FIG. 2 shows a particular number and arrangement of a plurality of items of two-dimensional content 205 within an environment 202 based on respective associated properties 207, various other numbers or arrangements of two-dimensional content 205 may be created within an environment 202 with respective associated properties 207.

Figure 3:
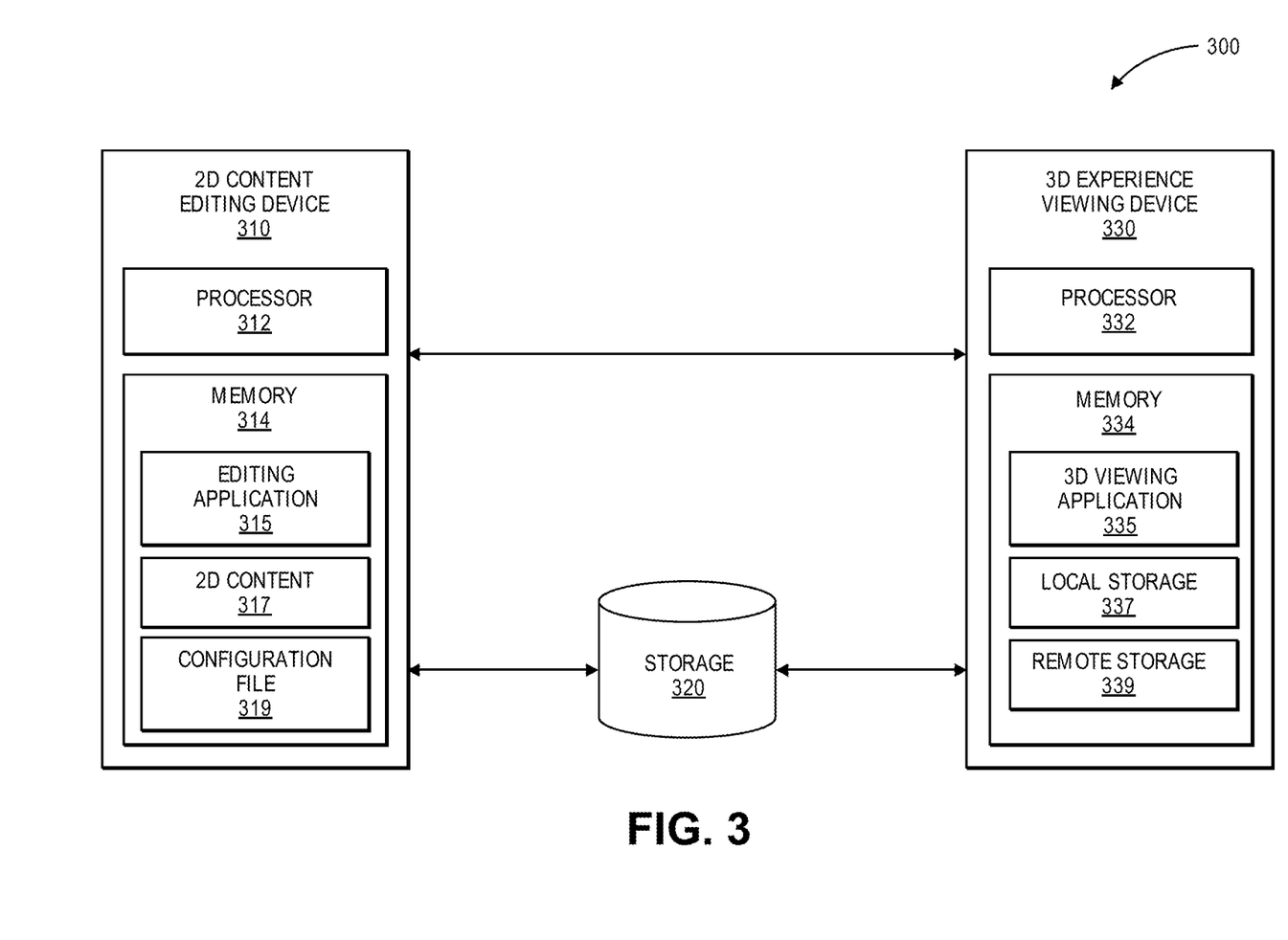
FIG. 3 is a block diagram illustrating various components of an example system architecture to create three-dimensional experiences, according to an implementation.

FIG. 3 is a block diagram illustrating various components of an example system architecture 300 to create three-dimensional experiences, according to an implementation.

The example system architecture 300 may comprise a two-dimensional content editing device 310, storage 320, and a three-dimensional experience viewing device 330. The two-dimensional content editing device 310, storage 320, and/or the three-dimensional experience viewing device 330 may be in communication with each other, and content, configuration files, and/or other data may be transmitted between the components of the example system architecture 300. In some example embodiments, the two-dimensional content editing device 310 and the three-dimensional experience viewing device 330 may be in direct communication with each other, e.g., via a wired or wireless connection. In other example embodiments, the two-dimensional content editing device 310 and the three-dimensional experience viewing device 330 may each communicate with storage 320, e.g., via a wired or wireless connection.

The two-dimensional content editing device 310 may comprise a computing device having a processor 312 and a memory 314. The two-dimensional content editing device 310 may be any type of computing device, such as a desktop computer, laptop computer, tablet computing device, mobile computing device, or other computing device. In addition, the two-dimensional content editing device 310 may comprise one or more input/output devices, such as a keyboard, mouse, display, touchscreen, microphone, speaker, or other input/output devices via which a user may interact with the two-dimensional content editing device 310.

The memory 314 may comprise an editing application 315, two-dimensional content 317, and/or configuration files 319. For example, the editing application 315 may comprise various applications that may be used to create, edit, or modify various items of two-dimensional content 317 and/or one or more configuration files 319. In example embodiments, the editing application 315 may comprise two-dimensional image or video content creation or editing applications, such as Photoshop or Sketch. In additional example embodiments, the editing application 315 may comprise two-dimensional user interface element, widget, and/or text creation or editing applications. In further example embodiments, the editing application 315 may comprise a machine-readable and/or human-legible markup language editor, examples of which may include JavaScript Object Notation (JSON), Extensible Markup Language (XML), Unified Modeling Language (UML), Yet Another Markup Language (YAML), or other types of markup languages.

In other example embodiments, the editing application 315 may comprise one or more interactive user interfaces via which one or more properties associated with each item of two-dimensional content may be received and processed to generate the configuration files 319. For example, the interactive user interfaces may comprise prompts, selectable options, and/or fillable fields or text boxes via which a user may select or provide the one or more properties associated with each item of two-dimensional content. In addition, the interactive user interfaces may comprise a graphical user interface via which a user may visually or graphically locate, orient, or otherwise modify two-dimensional content. By using such interactive user interfaces, a user may not be required to understand the rules or formatting of any particular machine-readable and/or human-legible markup languages, and instead, the configuration files may be at least partially automatically generated based on inputs provided by a user via interactive user interface elements or graphical user interfaces.

As described herein, the two-dimensional content 317 may comprise one or more skybox environments, as well as one or more images, videos, user interface elements, widgets, text, or other types of content. For example, the one or more skybox environments and/or one or more images, user interface elements, or text may comprise various types of image files, such as Portable Network Graphics (PNG), Joint Photographic Experts Group (JPG), Graphics Interchange Format (GIF), or other types of image files. In addition, the configuration files 319 may comprise one or more properties associated with individual items of two-dimensional content

317. As described herein, the one or more properties may comprise a size, scale, position, distance, horizontal offset, vertical offset, orientation, rotation, color, fade time, or other properties of the two-dimensional content 317. In example embodiments, the configuration files may comprise the one or more properties formatted according to various types of machine-readable and/or human-legible markup languages, which may be generated manually by users or at least partially automatically based on user inputs, as described herein.

Using the two-dimensional content editing device 310 and/or the editing application 315, a user may create, edit, or modify a skybox environment for a three-dimensional experience. In addition, a user may create, edit, or modify one or more items of two-dimensional content to be rendered within the three-dimensional experience. Further, a user may create, edit, or modify one or more configuration files including properties associated with individual items of two-dimensional content, in which the one or more properties may define a location, orientation, visual aspects, or other properties of the two-dimensional content to be rendered within the three-dimensional experience.

The skybox environment, two-dimensional content, and/or configuration files may be uploaded, stored, or recorded in storage 320. In example embodiments, the storage 320 may be local storage associated with or proximate the two-dimensional content editing device 310, local storage associated with or proximate the three-dimensional experience viewing device 330, remote or cloud storage, or various combinations thereof. In other example embodiments, the skybox environment, two-dimensional content, and/or configuration files may be transmitted, uploaded, or stored directly between the two-dimensional content editing device 310 and the three-dimensional experience viewing device 330.

The three-dimensional experience viewing device 330 may comprise a computing device having a processor 332 and a memory 334. The three-dimensional experience viewing device 330 may be any type of computing device, such as a wearable display and/or headset, desktop computer, laptop computer, tablet computing device, mobile computing device, or other three-dimensional experience viewing and/or computing device. In addition, the three-dimensional experience viewing device 330 may comprise one or more input/output devices, such as a keyboard, mouse, controller, display, touchscreen, microphone, speaker, or other input/output devices via which a user may interact with the three-dimensional experience viewing device 330.

The memory 334 may comprise a three-dimensional viewing application 335, local storage 337, and/or remote storage 339. For example, the three-dimensional viewing application 335 may comprise various applications that may be used to process, render, or present a skybox environment and/or two-dimensional content within a three-dimensional experience based at least in part on one or more properties included in one or more configuration files. In example embodiments, the three-dimensional viewing application 335 may define one or more aspects or constraints of the three-dimensional experience, such as available locations for rendering the two-dimensional content, viewing positions or orientations of a user of the three-dimensional experience viewing device and/or application, various dimensions associated with the three-dimensional environment, boundaries of the three-dimensional environment, and/or other aspects of the three-dimensional experience. Accordingly, the skybox environment and/or two-dimensional content may be processed, rendered, or presented based at least in part on the one or more constraints of the three-dimensional experience.

The local storage 337 may receive or store data related to the skybox environment, two-dimensional content, and/or configuration files directly from the two-dimensional content editing device 310. For example, by receiving data directly from the two-dimensional content editing device 310, e.g., via a wired connection, the data related to the skybox environment, two-dimensional content, and/or configuration files may be rapidly created, viewed, modified, and iterated upon using the two-dimensional content editing device 310 and the three-dimensional experience viewing device 330. To further increase the iteration speed, one or more listeners may be included as part of the three-dimensional experience viewing device 330 that automatically receive, process, render, and/or present any changes to data stored within the local storage 337. For example, the stored data, or various individual data items within the stored data, may include state indicators, flags, or tags that indicate whether the stored data, or individual data items thereof, have been modified over data previously received by the local storage 337, and the three-dimensional experience viewing device and/or application may update the local storage 337 based on such state indicators, flags, or tags and/or may automatically process and/or present such changes.

The remote storage 339 may receive or store data related to the skybox environment, two-dimensional content, and/or configuration files from storage 320, which may be remote or cloud storage. For example, the storage 320 may store the last version of the data related to the skybox environment, two-dimensional content, and/or configuration files that was made available to other users, an intended audience, or the public. Similarly, the remote storage 339 of the three-dimensional experience viewing device 330 may also store the last version of the data related to the skybox environment, two-dimensional content, and/or configuration files that was made available to other users, an intended audience, or the public. If the storage 320 is remote or cloud storage, the transmission, upload, and/or download times between storage 320 and the two-dimensional content editing device 310 and/or the three-dimensional experience viewing device 330 may be longer than a direct connection between the two-dimensional content editing device 310 and the three-dimensional experience viewing device 330. As a result, the iteration speed may be reduced when transmitting data to/from the storage 320 as compared to utilizing a direction connection between devices 310, 330. Nonetheless, to further increase the iteration speed, one or more listeners may be included as part of the three-dimensional experience viewing device 330 that automatically receive, process, render, and/or present any changes to data stored within the remote storage 339 and received from storage 320. For example, the stored data, or various individual data items within the stored data, may include state indicators, flags, or tags that indicate whether the stored data, or individual data items thereof, have been modified over data previously received by the remote storage 339, and the three-dimensional experience viewing device and/or application may update the remote storage 339 based on such state indicators, flags, or tags and/or may automatically process and/or present such changes.

Although FIG. 3 shows a three-dimensional experience viewing device 330 that includes both local storage 337 and remote storage 339, in other example embodiments, the three-dimensional experience viewing device 330 may include other numbers or configurations of storage, such as only one memory, or more than two memories. Moreover, the various memories may be partitioned or configured in various manners to store the different data related to the skybox environment, two-dimensional content, and/or configuration files.

Using the three-dimensional experience viewing device 330 and/or the three-dimensional viewing application 335, a user may process, view, or review a skybox environment for a three-dimensional experience based on one or more properties included in one or more configuration files. In addition, a user may process, view, or review one or more items of two-dimensional content that are rendered within the three-dimensional experience based on one or more properties included in one or more configuration files.

Using the example system architecture 300 of FIG. 3, a user may rapidly create, edit, view, review, modify, and/or iterate upon aspects of a three-dimensional experience without the need for specialized tools, training, or experience, such as specialized three-dimensional modeling or programming tools, training, or experience. For example, a user may create a two-dimensional skybox environment that can be presented within a three-dimensional experience, a user may create one or more two-dimensional objects that can also be presented within a three-dimensional experience, a user may provide properties of the two-dimensional skybox environment and/or the two-dimensional objects that define locations, orientations, visual aspects, or other properties of the skybox environment and two-dimensional objects within a three-dimensional experience, a user may rapidly process and view a three-dimensional experience including a skybox environment and two-dimensional objects, a user may modify or iterate upon any of the skybox environment, objects, or associated properties, a user may rapidly process and view a three-dimensional experience including any modifications or iterations, and/or a user may upload, store, or record a version of the three-dimensional experience for viewing by other users, an intended audience, or the public.

As described herein, a three-dimensional experience may include a sequence of slides or instances. In addition, each slide or instance may comprise a respective state or view of the three-dimensional experience, in which each state or view may be presented responsive to one or more user inputs or selections. The sequence may have a defined order, such as a linear order from a first slide to a last slide, or an order defined based on interactions with one or more portions, elements, or hotspots created within one or more slides. For example, selection of a first user interface element within a first slide may cause presentation of a second slide responsive to such selection, whereas selection of a second user interface element within the first slide may cause presentation of a third slide responsive to such selection. In addition, each slide within a sequence may include one or more items of two-dimensional content, in which individual items of two-dimensional content are located, oriented, or presented with visual aspects based on one or more properties associated therewith. Further, each item of two-dimensional content may comprise one or more images, videos, widgets, user interface elements, text, or other content.

FIG. 4 is a portion of an example configuration file 400, according to an implementation.

As described herein, configuration files may be formatted according to various types of machine-readable and/or human-legible markup languages. In addition, configuration files may be created manually by a user via a markup language editor, or may be created at least partially automatically from data or information provided by a user via interactive user interfaces and/or graphical user interfaces.

As shown in FIG. 4, a first portion 402 of the example configuration file 400 may define visual aspects of a sequence overall. For example, the first portion 402 may define a skybox environment for the sequence, i.e., a skybox environment titled "outerspace" that may correspond to one or more skybox environment image files. In addition, the first portion 402 may define a crossFadeTime of 2.0 seconds between respective slides or instances of the sequence. For example, the fade time may define a duration of time for fading out a first slide, as well as a duration of time for fading in a second slide. Alternatively, the fade time may define a duration of time for both fading out a first slide and fading in a second slide. In addition, fade times may be defined in terms of seconds, milliseconds, or other units of time. Other visual aspects associated with the sequence overall may also be defined as part of first portion 402, as further described herein.

A second portion 404 of the example configuration file 400 may define a first slide or instance of the sequence. For example, the second portion 404 may define a skybox environment for the slide, i.e., a skybox environment titled "null" that may result in using the skybox environment defined for the sequence overall. Other example slides may select a skybox environment for the slide that is different from the skybox environment selected for the sequence overall. The second portion 404 may also define one or more items of two-dimensional content, i.e., "images," to be included within the first slide. As shown in FIG. 4, the second portion 404 may include only a single item of two-dimensional content, i.e., an image file titled "1.png" having various properties, i.e., a distance of "8.0," a scale of "1.0," an xOffset of "0.0," and a yOffset of "−100.0." In example embodiments, the distance may relate to a distance from a position of a user of the three-dimensional experience and may be measured in meters or other units. The scale may relate to a sizing of the image file and may be defined relative to an original size starting at 1.0, with double the size being 2.0, or any other units. The xOffset may relate to a horizontal offset of the image file relative to a center point (defined as 0.0) of a field of view of a user of the three-dimensional experience and may be measured in pixels, meters, or other units. The yOffset may relate to a vertical offset of the image file relative to a center point (defined as 0.0) of a field of view of a user of the three-dimensional experience and may be measured in pixels, meters, or other units.

A third portion 406 of the example configuration file 400 may define a second slide or instance of the sequence. For example, the third portion 406 may define a skybox environment for the slide, i.e., a skybox environment titled "null" that may result in using the skybox environment defined for the sequence overall. Other example slides may select a skybox environment for the slide that is different from the skybox environment selected for the sequence overall. The third portion 406 may also define one or more items of two-dimensional content, i.e., "images," to be included within the second slide. As shown in FIG. 4, the third portion 406 may include only a single item of two-dimensional content, i.e., an image file titled "2.png" having various properties, i.e., a distance of "10.0," a scale of "2.0," an xOffset of "50.0," a yOffset of "50.0," an ignoreFadeIn flag of "TRUE," and an ignoreFadeOut flag of "TRUE." In example embodiments, the distance may relate to a distance from a position of a user of the three-dimensional experience and may be measured in meters or other units. The scale may relate to a sizing of the image file and may be defined relative to an original size starting at 1.0, with double the size being 2.0, or any other units. The xOffset may relate to a horizontal offset of the image file relative to a center point (defined as 0.0) of a field of view of a user of the three-dimensional experience and may be measured in pixels, meters, or other units. The yOffset may relate to a vertical offset of the image file relative to a center point (defined as 0.0) of a field of view of a user of the three-dimensional experience and may be measured in pixels, meters, or other units. The ignoreFadeIn and ignoreFadeOut flags may relate to whether the second slide will fade in and fade out, respectively, using the crossFadeTime selected for the sequence in first portion 402, with the flag "TRUE" indicating that the fade time is to be ignored, and with the flag "FALSE" or the absence of this property indicating that the fade time is to be applied to the slide.

A fourth portion 408 of the example configuration file 400 may define a third slide or instance of the sequence. For example, the fourth portion 408 may define a skybox environment for the slide, i.e., a skybox environment titled "spacestation" that may correspond to one or more skybox environment image files that are different from the skybox environment selected for the sequence overall. The fourth portion 408 may also define a crossFadeTime of 3.0 seconds for the slide that is different from the crossFadeTime selected for the sequence overall. The fourth portion 408 may also define one or more items of two-dimensional content, i.e., "images," to be included within the third slide. As shown in FIG. 4, the fourth portion 408 may include three items of two-dimensional content, i.e., an image file titled "3.png" having various properties, i.e., a distance of "8.0," a scale of "1.0," an xOffset of "0.0," a yOffset of "−100.0," an image file titled "4.png" having various properties, i.e., a distance of "3.0," a scale of "0.5," an xOffset of "0.0," a yOffset of "−105.0," and an image file titled "5.png" having various properties, i.e., a distance of "1.0," a scale of "0.2," an xOffset of "10.0," a yOffset of "−100.0," a tintHex of "999999ff," and crossFadeTime of "4.0." In example embodiments, the distance may relate to a distance from a position of a user of the three-dimensional experience and may be measured in meters or other units. The scale may relate to a sizing of the image file and may be defined relative to an original size starting at 1.0, with double the size being 2.0, or any other units. The xOffset may relate to a horizontal offset of the image file relative to a center point (defined as 0.0) of a field of view of a user of the three-dimensional experience and may be measured in pixels, meters, or other units. The yOffset may relate to a vertical offset of the image file relative to a center point (defined as 0.0) of a field of view of a user of the three-dimensional experience and may be measured in pixels, meters, or other units. The tintHex may relate to a color applied to the image file that is defined as a hexadecimal color value, although other color models, values, or definitions may also be used, such as RGB or CMYK color models or values. The crossFadeTime may define a fade in and/or fade out time for this image file, i.e., "5.png," that is different from the crossFadeTime selected for the third slide and also different from the crossFadeTime selected for the sequence overall.

Accordingly, as shown in FIG. 4, various properties may be defined for each object or image, each slide or instance comprising one or more objects, and/or each sequence comprising one or more slides or instances. In addition, although FIG. 4 shows a particular sequence having a particular number, arrangement, and/or combination of slides, objects, and properties, various other numbers, arrangements, and/or combinations of slides, objects, and/or properties are possible.

Figure 5:
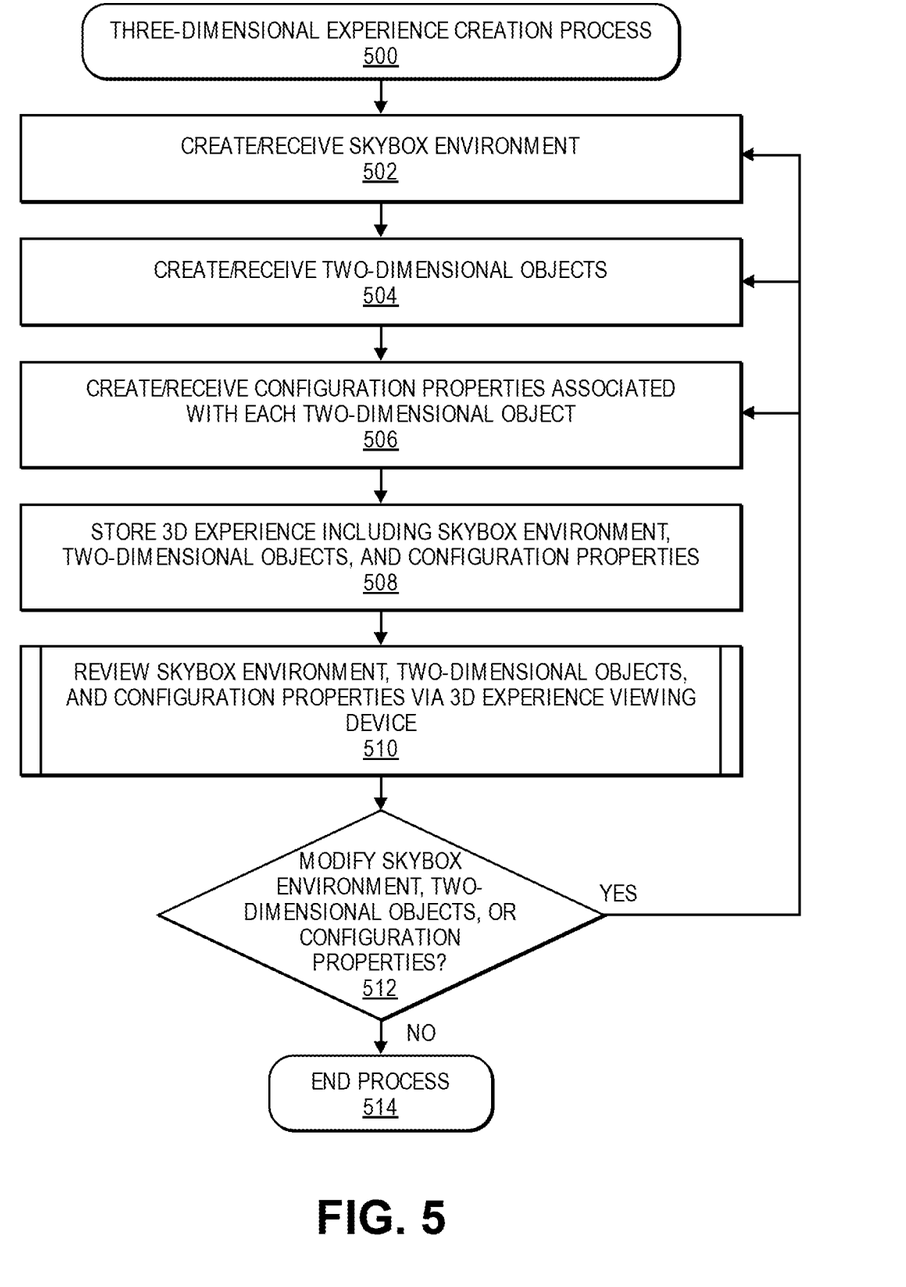
FIG. 5 is a flow diagram illustrating an example three-dimensional experience creation process, according to an implementation.

FIG. 5 is a flow diagram illustrating an example three-dimensional experience creation process 500, according to an implementation.

The process 500 may begin by creating or receiving a skybox environment, as at 502. As described herein, the skybox environment may comprise one or more two-dimensional image files that may be stitched, stretched, formed, or otherwise processed to present a background environment within a three-dimensional experience. The skybox environment may be created and/or modified using a two-dimensional content editing device and/or application, as further described herein.

The process 500 may continue by creating or receiving one or more two-dimensional objects, as at 504. As described herein, the two-dimensional objects or content may comprise one or more images, videos, user interface elements, widgets, text, or other content. The two-dimensional objects or content may be created and/or modified using a two-dimensional content editing device and/or application, as further described herein.

The process 500 may proceed by creating or receiving configuration properties associated with each two-dimensional object, as at 506. As described herein, one or more configuration files may be generated including one or more properties that are associated with individual items of two-dimensional objects or content. In addition, the one or more properties may define a size, scale, position, distance, horizontal offset, vertical offset, orientation, rotation, color, fade time, or other properties of the two-dimensional objects or content. The configuration files may be created and/or modified using a two-dimensional content editing device and/or application such as a markup language editor, an interactive user interface, or a graphical user interface, as further described herein.

The process 500 may continue to store a three-dimensional experience including the skybox environment, the two-dimensional objects, and configuration properties, as at 508. As described herein, one or more image files for the skybox environment, the two-dimensional objects or content, and/or one or more configuration files may be transmitted, uploaded, stored, and/or recorded in one or more memories or storage. The storage may be local to one or both of a two-dimensional content editing device or a three-dimensional experience viewing device. In addition or alternatively, the storage may be remote or cloud storage. In some example embodiments, local storage and/or wired connections may be used for rapid content creation, editing, review, and/or iteration processes, whereas remote storage and/or wireless connections may be used to store, download, or publish final or approved versions that may be viewable by other users, an intended audience, or the public.

The process 500 may then proceed to review the skybox environment, two-dimensional objects, and configuration properties via a three-dimensional experience viewing device, as at 510. As described herein, a three-dimensional experience viewing device and/or application may receive, download, process, render, and/or present the skybox environment and/or two-dimensional objects or content based at least in part on the one or more properties defined in one or more configuration files, as well as based at least in part on defined aspects or constraints of the three-dimensional experience. Additional aspects and details related to step 510 are described further herein with respect to FIG. 6.

The process 500 may then determine whether the skybox environment, two-dimensional objects, or configuration properties are to be modified, as at 512. As described herein, based at least upon a review of the three-dimensional experience via the three-dimensional experience viewing device and/or application, it may be determined that one or more changes or modifications are desired for the skybox environment, the two-dimensional objects or content, and/or the configuration files. If one or more changes are desired, then the process 500 may return to one or more of steps 502, 504, 506 to modify one or more of the skybox environment, the two-dimensional objects or content, and/or the configuration files. Such changes may then again be transmitted, uploaded, stored, and/or recorded, as at 508, and the changes may then again be reviewed via the three-dimensional experience viewing device and/or application, as at 510. In some example embodiments, one or more listeners may be included as part of the memories or storage and/or the three-dimensional experience viewing device and/or application, such that any changes to the skybox environment, the two-dimensional objects or content, and/or the configuration files may be automatically received, processed, and/or presented for review by a user of the three-dimensional experience viewing device and/or application. For example, the stored data, or various individual data items within the stored data, may include state indicators, flags, or tags that indicate whether the stored data, or individual data items thereof, have been modified over data previously received and stored in one or more memories, storage, and/or the three-dimensional experience viewing device and/or application. In this manner, rapid creation, modification, review, and/or iteration of three-dimensional experiences may be further facilitated.

If it is determined at step 512 that no modifications or changes are desired, the process 500 may end, as at 514. In some example embodiments, as part of the determination that no modifications or changes are desired, the skybox environment, the two-dimensional objects or content, and the configuration files may be transmitted, uploaded, stored, and/or recorded in one or more memories or storage, such as remote or cloud storage, so as to be viewable by other users, an intended audience, or the public.

Figure 6:
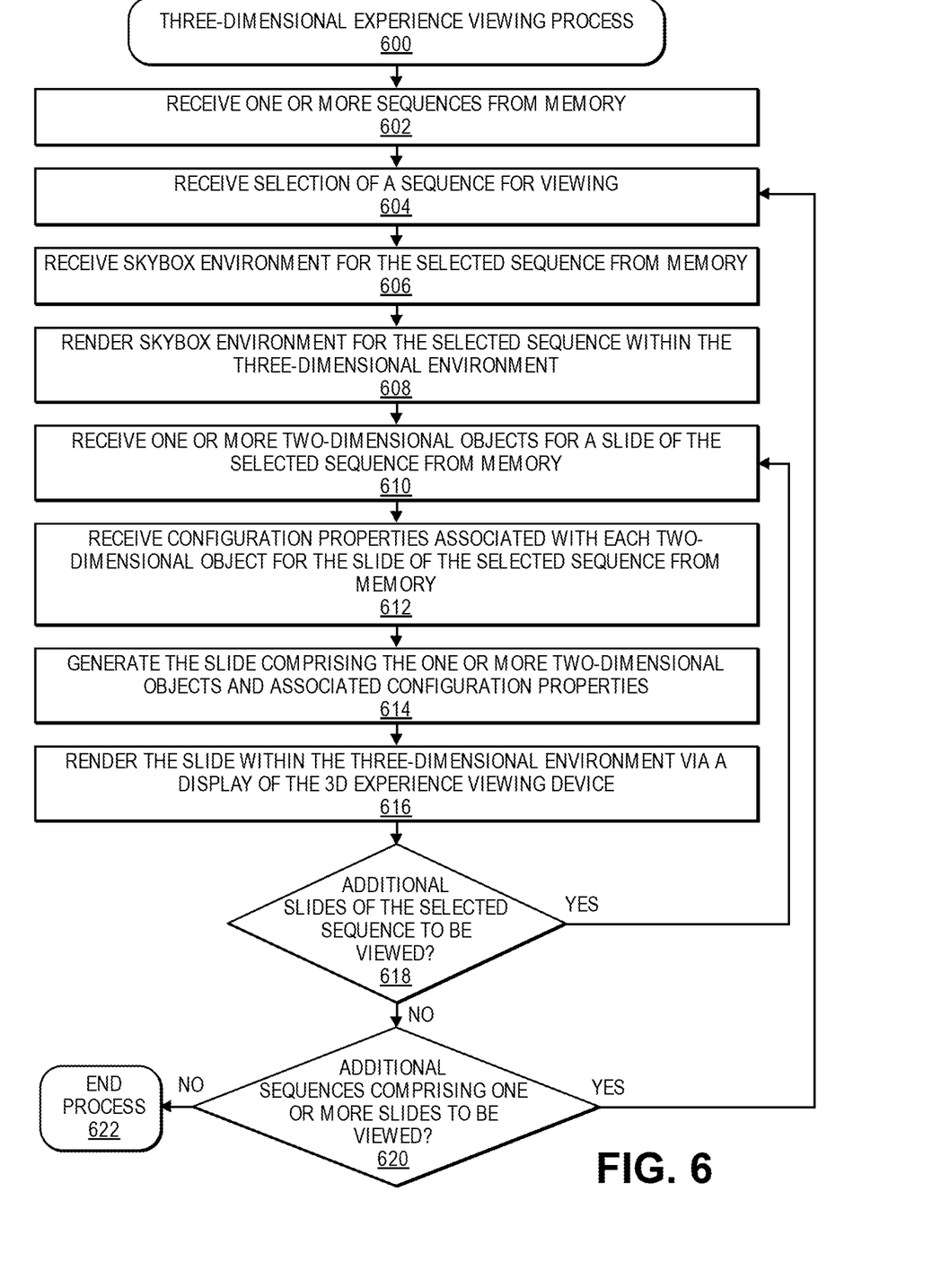
FIG. 6 is a flow diagram illustrating an example three-dimensional experience viewing process, according to an implementation.

FIG. 6 is a flow diagram illustrating an example three-dimensional experience viewing process 600, according to an implementation.

The process 600 may begin by receiving one or more sequences from memory, as at 602. For example, a three-dimensional experience viewing device and/or application may receive one or more sequences from a two-dimensional content editing device and/or application, remote or cloud storage, or other memories or storage. The three-dimensional experience viewing device and/or application may store the received sequences in local storage that is associated with data received from a two-dimensional content editing device and/or application, or in remote storage that is associated with data received from remote or cloud storage. In some example embodiments, the most recent modifications, edits, and/or updates to sequences may be initially stored in local storage of the three-dimensional experience viewing device and/or application, and any conflicts between data stored in multiple data stores or memories of the three-dimensional experience viewing device and/or application may be resolved in favor of the local storage. In alternative example embodiments, the three-dimensional experience viewing device and/or application may include only a single data store or memory in which to receive and store sequences. As described herein, each sequence may comprise one or more slides or instances to be displayed within a three-dimensional environment, and each slide may include one or more items of two-dimensional content to be located, oriented, and/or presented within the three-dimensional environment based on one or more properties associated with each item of two-dimensional content.

The process 600 may proceed by receiving a selection of a sequence for viewing, as at 604. For example, if a plurality of sequences are available for viewing via the three-dimensional experience viewing device and/or application, a user may be prompted to select a particular sequence for viewing. Alternatively, if only a single sequence is available for viewing, the process 600 may skip this step 604 and automatically proceed to the following step 606.

Upon receiving the selection of a sequence, the process 600 may continue by receiving the skybox environment for the selected sequence from memory, as at 606. For example, the three-dimensional experience viewing device and/or application may receive the skybox environment that may be used to generate a background scene, location, or setting within the three-dimensional environment. As described herein, the skybox environment may comprise one or more images, and/or an equirectangular image, that may be stitched, formed, stretched, or otherwise processed to form a background scene, location, or setting.

The process 600 may then proceed to render the skybox environment for the selected sequence within the three-dimensional environment, as at 608. For example, the skybox environment may be displayed or rendered by a display, screen, monitor, headset, or other visual output device and/or wearable device that can simulate a three-dimensional environment. The skybox environment may comprise a sphere or a dome around a position of a user of the three-dimensional environment. In addition, the skybox environment may be displayed or rendered subject to one or more aspects or constraints associated with the three-dimensional experience, such as viewing positions or orientations of a user of the three-dimensional experience viewing application, dimensions associated with the three-dimensional environment, and/or boundaries of the three-dimensional environment. Further, as described herein, various other aspects of the three-dimensional experience may be defined or modified for the selected sequence, such as fade in or fade out times, or various other properties.

The process 600 may then continue to receive one or more two-dimensional objects for a slide of the selected sequence from memory, as at 610. For example, starting from a first or current slide of the selected sequence, one or more two-dimensional objects or content to be presented as part of the current slide may be received. As described herein, the two-dimensional content may comprise images, videos, user interface elements, widgets, text, or other content.

The process 600 may then proceed to receive configuration properties associated with each two-dimensional object for the slide of the selected sequence from memory, as at 612. For example, one or more configuration files defining one or more properties for each two-dimensional object or content to be presented as part of the current slide may be received. As described herein, the one or more properties may define aspects related to location, orientation, visual aspects, or other properties of each item of two-dimensional content to be presented within a three-dimensional environment.

Then, the process 600 may continue by generating the slide comprising the one or more two-dimensional objects and associated configuration properties, as at 614. For example, the current slide may be generated with the received two-dimensional objects or content based at least in part on the one or more properties associated with each two-dimensional object or content, which may define their placement, orientation, color, size, scale, or other visual aspects within the three-dimensional environment.

The process 600 may then proceed to render the slide within the three-dimensional environment via a display of the three-dimensional experience viewing device, as at 616. For example, the current slide may be displayed or rendered by a display, screen, monitor, headset, or other visual output device and/or wearable device that can simulate a three-dimensional environment. The current slide may be rendered together with the skybox environment of the three-dimensional environment. In addition, the current slide may be displayed or rendered subject to one or more aspects or constraints associated with the three-dimensional experience, such as available locations for rendering two-dimensional objects or content, viewing positions or orientations of a user of the three-dimensional experience viewing application, dimensions associated with the three-dimensional environment, and/or boundaries of the three-dimensional environment. Further, as described herein, various other aspects of the three-dimensional experience may be defined or modified for the current slide, such as the skybox environment, fade in or fade out times, or various other properties.

In this manner, the one or more two-dimensional objects may be rendered within the three-dimensional environment such that a user of the three-dimensional experience viewing device perceives the one or more two-dimensional objects as three-dimensional objects within the three-dimensional environment. For example, the one or more two-dimensional objects may appear to be transformed into three-dimensional objects from a perspective of a user of the three-dimensional experience viewing device. Stated differently, the three-dimensional experience viewing device may simulate the three-dimensional experience from a perspective of a user of the three-dimensional experience viewing device using two-dimensional content and associated properties within the three-dimensional environment.

The process 600 may then determine whether any additional slides of the selected sequence are to be viewed, as at 618. For example, if there are additional slides other than the current slide or any previously viewed slides that are to be generated and rendered for presentation to a user via the three-dimensional experience viewing device and/or application, the process 600 may return to steps 610, 612, 614, 616 to receive, generate, and render for presentation such additional slides with their corresponding two-dimensional objects and associated properties.

If it is determined at step 618 that no additional slides of the selected sequence are to be viewed, then the process 600 may proceed to determine whether any additional sequences comprising one or more slides are to be viewed, as at 620. For example, after completion of viewing of the selected sequence, the process 600 may return to step 604 to receive a selection of a next sequence for viewing. If, however, it is determined at step 620 that no additional sequences are available or selected for viewing, then the process 600 may then end, as at 622.

By the systems and processes described herein, rapid creation, review, modification, and/or iteration of three-dimensional experiences using two-dimensional content and associated properties may be facilitated without requiring specialized tools, training, or experience in three-dimensional object, model, or environment creation, programming, or development. Further, with incorporation of listeners or other state indicators or flags in the components, devices, or applications described herein, any updates or modifications to stored data, or individual data items thereof, may be automatically identified and processed to further facilitate the rapid review and iteration of such three-dimensional experiences.

Referring again to FIG. 3, in various examples, the block diagram may be illustrative of one or more aspects of the example system architecture that may be used to implement the various systems and processes discussed above. In the illustrated implementation, the example system architecture includes a two-dimensional content editing device and a three-dimensional experience viewing device that may each include one or more processors 312, 332, coupled to each other and/or a non-transitory computer readable storage medium or storage 320 via one or more communication or network connections. In various implementations, the one or more communication or network connections may support communication via wireless general data networks, such as a Wi-Fi network, or via telecommunications networks such as cellular communication networks, satellite networks, and the like.

In various implementations, the two-dimensional content editing device and the three-dimensional experience viewing device of the example system architecture may be uniprocessor systems including one processor 312, 332, or multiprocessor systems including several processors 312, 332 (e.g., two, four, eight, or another suitable number). The processor(s) 312, 332 may be any suitable processor capable of executing instructions. For example, in various implementations, the processor(s) 312, 332 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 312, 332 may commonly, but not necessarily, implement the same ISA.

The non-transitory computer readable storage medium or storage 320 may be configured to store executable instructions, applications, skybox environments, two-dimensional content, configuration files, and/or other data items accessible by the processor(s) 312, 332. In various implementations, the non-transitory computer readable storage medium or storage 320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are stored within the non-transitory computer readable storage medium or storage 320 as program instructions, data storage and other data items. In other implementations, program instructions, data and/or other data items may be received, sent or stored upon different types of computer-accessible media, such as non-transitory media, or on similar media separate from the non-transitory computer readable storage medium or storage 320 or the example system architecture 300.

Generally speaking, a non-transitory, computer readable storage medium may include storage media or memory media such as magnetic or optical media, e.g., disk or CD/DVD-ROM, coupled to the example system architecture 300 via one or more communication or network connections. Program instructions and data stored via a non-transitory computer readable medium may be transmitted by transmission media or signals, such as electrical, electromagnetic, or digital signals, which may be conveyed via a communication medium such as a network, wired link, and/or a wireless link, such as may be implemented via the one or more communication or network connections.

One or both of the two-dimensional content editing device and the three-dimensional experience viewing device of the example system architecture may, in some implementations, include one or more input/output devices, such as displays, touchscreens, image capture devices, keyboards, mice, controllers, microphones, speakers, or other input/output devices. Multiple input/output devices may be used as part of the example system architecture.

As shown in FIG. 3, the memories or storage 314, 320, 334, as well as the local storage 337 and/or remote storage 339, may include program instructions and other data items which may be configured to implement the example processes and/or sub-processes described above. The data storage 314, 320, 334, 337, 339 may include various data stores for maintaining data items that may be provided for rapidly creating, modifying, viewing, reviewing, processing, rendering, and/or presenting one or more aspects related to three-dimensional experiences.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the example system architecture is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The example system architecture may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the example system architecture. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the example system architecture may be transmitted to the example system architecture via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other example system architecture configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method to create a three-dimensional experience, comprising:
   receiving a plurality of image files defining a three-dimensional environment;
   receiving a plurality of two-dimensional objects to be positioned within the three-dimensional environment, the plurality of two-dimensional objects being distinct elements from the plurality of image files defining the three-dimensional environment;
   receiving a plurality of properties associated with individual ones of the plurality of two-dimensional objects;
   storing the plurality of image files defining the three-dimensional environment, the plurality of two-dimensional objects, and the plurality of properties in at least one data store;
   rendering, via a three-dimensional experience viewing device, the plurality of image files defining boundaries of the three-dimensional environment; and
   rendering, via the three-dimensional experience viewing device, individual ones of the plurality of two-dimensional objects within the boundaries of the three-dimensional environment, wherein at least one of a position, scale, color, or fade time of individual ones of the plurality of two-dimensional objects is defined by the plurality of properties associated with individual ones of the plurality of two-dimensional objects, thereby simulating the three-dimensional experience from a perspective of a user of the three-dimensional experience viewing device via individual ones of the plurality of two-dimensional objects that are perceived as three-dimensional objects within the boundaries of the three-dimensional environment.

2. The computer-implemented method of claim 1, wherein the plurality of image files defining the three-dimensional environment comprise at least one of an equirectangular image configured to be stretched to encompass a sphere or dome, or a plurality of image files configured to be stitched together to encompass the sphere or dome.

3. The computer-implemented method of claim 1, wherein the plurality of two-dimensional objects comprise at least one of two-dimensional image files, two-dimensional video files, two-dimensional user interface elements, two-dimensional widgets, or two-dimensional text, and wherein the plurality of properties associated with individual ones of the plurality of two-dimensional objects are comprised in a markup language.

4. The computer-implemented method of claim 1, wherein the position comprises at least one of a distance in front of a user of the three-dimensional experience viewing device, a horizontal offset from a horizontal center position associated with the user of the three-dimensional experience viewing device, or a vertical offset from a vertical center position associated with the user of the three-dimensional experience viewing device.

5. A computer-implemented method, comprising:
   receiving, by a three-dimensional experience viewing device, a two-dimensional object to be positioned within boundaries of a three-dimensional environment, the two-dimensional object being a distinct element from an image file defining the boundaries of the three-dimensional environment;
   receiving, by the three-dimensional experience viewing device, a configuration file associated with the three-dimensional environment, the configuration file comprising at least one property associated the two-dimensional object; and
   rendering, via the three-dimensional experience viewing device, the two-dimensional object within the boundaries of the three-dimensional environment based at least in part on the at least one property such that a user of the three-dimensional experience viewing device perceives the two-dimensional object as a three-dimensional object within the boundaries of the three-dimensional environment.

6. The computer-implemented method of claim 5, wherein the two-dimensional object comprises at least one of a two-dimensional image file, two-dimensional video file, two-dimensional user interface element, two-dimensional widget, or two-dimensional text.

7. The computer-implemented method of claim 5, wherein the at least one property comprises at least one of a distance, horizontal offset, vertical offset, scale, rotation, color, or fade time associated with the two-dimensional object; and
   wherein the configuration file associated with the three-dimensional environment comprises a markup language.

8. The computer-implemented method of claim 5, wherein the configuration file is created at least one of manually, based on inputs received via a user interface, or based on interaction via a graphical user interface.

9. The computer-implemented method of claim 5, further comprising:
   storing the two-dimensional object and the configuration file in at least one data store; and
   receiving, by the three-dimensional experience viewing device, the two-dimensional object and the configuration file from the at least one data store.

10. The computer-implemented method of claim 9, further comprising:
    identifying, via the three-dimensional experience viewing device, at least one change to at least one of the two-dimensional object or the configuration file stored in the at least one data store; and
    modifying the rendering, via the three-dimensional experience viewing device, of the two-dimensional object based at least in part on the at least one change.

11. The computer-implemented method of claim 9, wherein the at least one data store comprises at least one of a memory local to the three-dimensional experience viewing device, or a memory remote from the three-dimensional experience viewing device.

12. The computer-implemented method of claim 5, wherein the three-dimensional experience viewing device comprises a three-dimensional experience viewing application configured to receive the two-dimensional object and the configuration file, and configured to render the two-dimensional object based at least in part on the at least one property.

13. The computer-implemented method of claim 12, wherein the three-dimensional experience viewing application defines at least one of available locations for rendering the two-dimensional object, viewing positions or orientations of a user of the three-dimensional experience viewing application, dimensions associated with the three-dimensional environment, or the boundaries of the three-dimensional environment.

14. The computer-implemented method of claim 12, wherein the three-dimensional experience viewing application is further configured to generate an instance of the three-dimensional environment comprising the two-dimensional object based at least in part on the at least one property.

15. The computer-implemented method of claim 14, further comprising:
  receiving the image file defining the three-dimensional environment;
  rendering, via the three-dimensional experience viewing device, the image file defining the boundaries of the three-dimensional environment;
  wherein the three-dimensional experience viewing application is configured to generate the instance of the three-dimensional environment further comprising the image file.

16. The computer-implemented method of claim 14, further comprising:
  receiving a second two-dimensional object to be positioned within the boundaries of the three-dimensional environment, the second two-dimensional object being a distinct element from the image file defining the boundaries of the three-dimensional environment; and
  wherein the configuration file comprises at least one second property associated with the second two-dimensional object;
  wherein the three-dimensional experience viewing application is further configured to generate a second instance of the three-dimensional environment comprising the second two-dimensional object based at least in part on the at least one second property.

17. The computer-implemented method of claim 16, further comprising:
  receiving a second image file defining the three-dimensional environment;
  rendering, via the three-dimensional experience viewing device, the second image file defining the boundaries of the three-dimensional environment;
  wherein the three-dimensional experience viewing application is configured to generate the second instance of the three-dimensional environment further comprising the second image file.

18. A computing device, comprising:
  a processor in communication with a memory;
  a display; and
  a three-dimensional experience viewing application stored in the memory associated with the computing device, the processor configured to execute the three-dimensional experience viewing application to at least:
    receive a two-dimensional object to be positioned within boundaries of a three-dimensional environment, the two-dimensional object being a distinct element from an image file defining the boundaries of the three-dimensional environment;
    receive a configuration file associated with the three-dimensional environment, the configuration file comprising at least one property associated with the two-dimensional object; and
    render, via the display, an instance of the three-dimensional environment comprising the two-dimensional object within the boundaries of the three-dimensional environment based at least in part on the at least one property such that a user of the three-dimensional experience viewing application perceives the two-dimensional object as a three-dimensional object within the instance of the three-dimensional environment.

19. The computing device of claim 18, wherein the processor is further configured to execute the three-dimensional experience viewing application to at least:
  receive the image file defining the three-dimensional environment; and
  render, via the display, the instance comprising the image file defining the boundaries of the three-dimensional environment.

20. The computer device of claim 18, wherein the processor is further configured to execute the three-dimensional experience viewing application to at least:
  identify at least one change to at least one of the two-dimensional object or the configuration file; and
  modify the rendering, via the display, of the instance of the three-dimensional environment comprising the two-dimensional object based at least in part on the at least one change.

* * * * *